Patented Oct. 2, 1928.

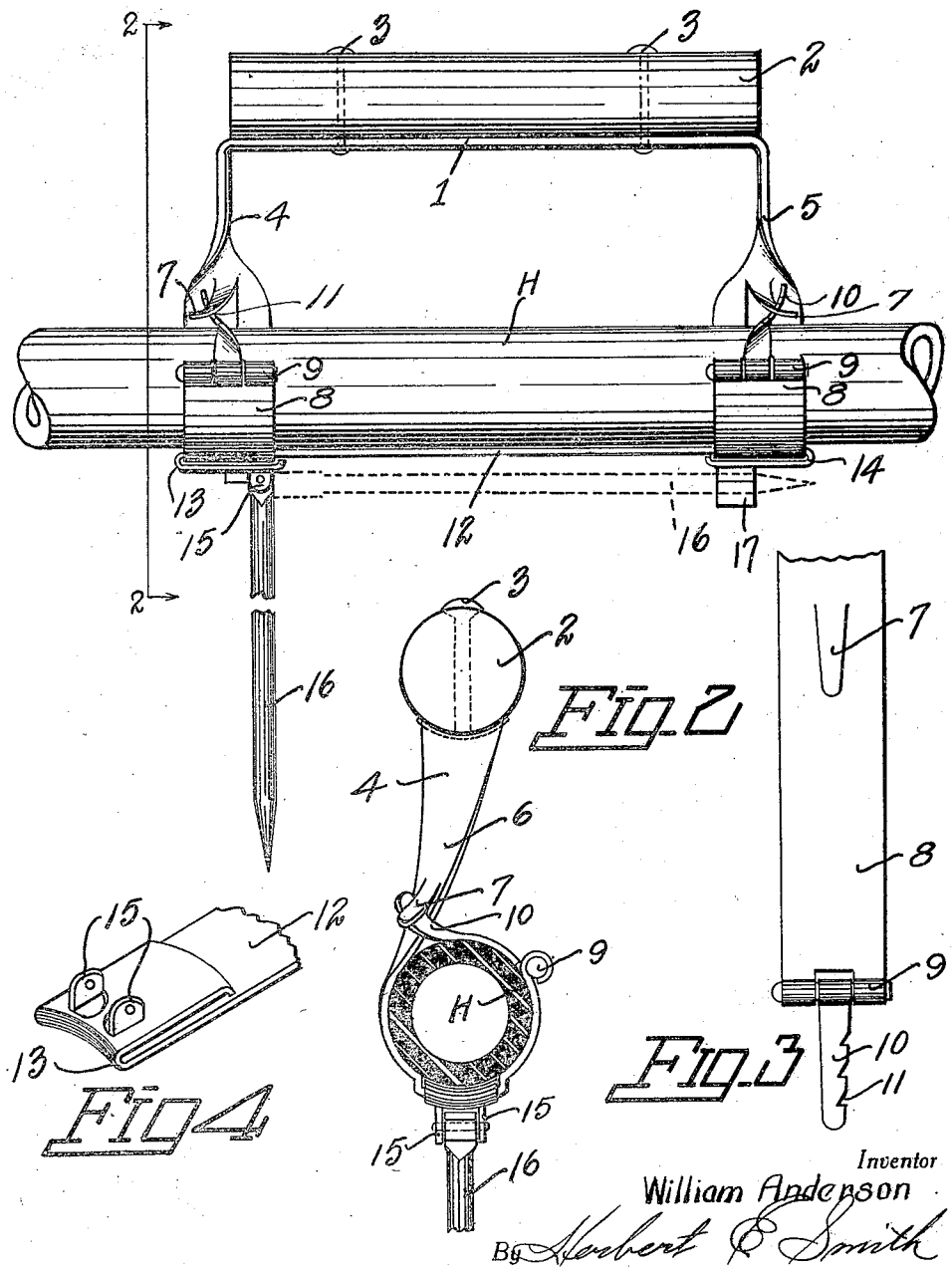

1,686,115

UNITED STATES PATENT OFFICE.

WILLIAM ANDERSON, OF SPOKANE, WASHINGTON.

HOSE HANDLE.

Application filed August 29, 1927. Serial No. 216,154.

My present invention relates to improvements in hose handles or carriers for use with the garden or lawn type of hose for the purpose of protecting the hands, facilitating the manipulation of the hose when watering or spraying a lawn, and for protection against leaks at the nozzle of the hose.

The primary object of the invention is the provision of a device of this character that is comparatively simple in construction and operation; inexpensive in the cost of manufacture; which is readily adjustable and easily attached to a hose; and which affords a convenient implement for the performance of its required functions.

The invention consists in certain novel combinations and arrangements of parts as will hereinafter be set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view illustrating the handle applied to a hose and ready for use.

Figure 2 is an end view of the handle as at line 2—2 of Figure 1.

Figure 3 is a detail view showing one arm of the handle before it is wrapped around or rolled around the hose.

Figure 4 is a detail perspective view at one end of a brace for the holder or handle.

In order that the general arrangement and relation of parts may readily be understood I have shown in Figure 1 a portion of a garden hose H of usual type and the handle or holder applied thereto.

The device of my invention includes a sheet metal blade 1 that is preferably curved to conform to the shape of a handle that may readily be grasped in the hand, and this blade may be used as the handle for the implement if desired. In some instances a wooden handle 2 may be riveted to the blade at 1 to be grasped in the hand, for supporting the hose.

The blade 1 is fashioned with a pair of spaced, parallel arms 4 and 5 disposed at an angle to the blade, and each of these arms is twisted as at 6 for adapting the handle to the periphery of the hose.

Each arm of the blade is provided with a stamped or cut out tongue 7, and as the metal from which the handle is fashioned is resilient, this tongue is of course also resilient. Below the tongue portion each blade is bent around the hose to form a band as 8 and this circular band, in each case terminates in a hinge 9 for a locking latch 10 that is fashioned with side notches 11. It will be apparent that the bands may readily be bent around the hose, the tongue 7 pushed from its slot, and then the resilient latch 10 is locked to the tongue. A selected one of the notches 11 is used in co-action with the tongue 7, depending upon the size of the hose, and when both of the tongues 7 and both of the latches 10 are snapped to locking position, the bands are retained about the hose with sufficient friction to prevent longitudinal slipping of the handle on the hose, but at the same time permit the handle to be swung around the hose in order that the handle may be adjusted to the hose if the latter is twisted. The handle of course is maintained in position above the hose at all times and by manipulating the hose through the handle the water may be sprayed or sprinkled over the lawn with convenience and without danger of wetting from a leaky nozzle.

The two bands are spaced apart and braced by means of a strap 12 which fits under the hose and is provided with end loops 13 and 14 that encircle the respective bands of the handle.

The loop 13 is provided with a pair of perforated ears 15 in which a stake or sharpened rod 16 is hinged, and this rod or stake when swung down to full line position in Figure 1 may be driven into the ground to form a support for the hose when it is necessary to elevate the hose for any purpose or when it is desired to support the hose in stationary position for sprinkling.

When not needed for use the stake may be swung on its hinge to dotted position in Figure 1 and snapped under a spring clip 17 on the loop 14 that engages under the sharpened end of the stake and holds the latter close to the brace 12 and out of the way when the handle is being used to support the hose in the hands of the user.

Having thus fully described my invention, what I claim as new and desire to secure by Letters Patent is—

1. A hose handle comprising a blade having spaced angular arms and resilient locking tongues on said arms, the ends of said arms terminating in bands to encircle a hose, and locking latches hinged at the free ends of the bands for locking engagement with the tongues.

2. A hose handle comprising a blade having spaced angular arms and a resilient tongue on each arm, said arms terminating in clamping bands, and locking latches hinged at the free ends of the bands for co-action with the tongues.

3. A hose handle comprising a blade having spaced angular arms and a resilient tongue on each arm, said arms terminating in clamping bands, a brace having looped ends about said bands, and locking latches hinged at the free ends of the bands for co-action with the tongues.

4. A hose handle comprising a pair of arms having resilient tongues, said arms terminating in clamping blades, and locking latches hinged at the free ends of the bands, said locking latches having lateral notches for selective use with said tongues.

In testimony whereof I affix my signature.

WILLIAM ANDERSON.